United States Patent
Wisley et al.

(10) Patent No.: US 11,532,184 B2
(45) Date of Patent: Dec. 20, 2022

(54) MONITORING THE OPERATION OF A WORK MACHINE

(71) Applicant: Caterpillar SARL, Geneva (CH)

(72) Inventors: David Wisley, Peterborough (GB); Alan Todd, Peterborough (GB); Michael Looney, Peterborough (GB); John Percival, Peterborough (GB)

(73) Assignee: Caterpillar SARL, Geneva (CH)

( * ) Notice: Subject to any disclaimer, the term of this patent is extended or adjusted under 35 U.S.C. 154(b) by 101 days.

(21) Appl. No.: 16/472,122

(22) PCT Filed: Dec. 21, 2017

(86) PCT No.: PCT/EP2017/084085
§ 371 (c)(1),
(2) Date: Jun. 20, 2019

(87) PCT Pub. No.: WO2018/115281
PCT Pub. Date: Jun. 28, 2018

(65) Prior Publication Data
US 2020/0105072 A1  Apr. 2, 2020

(30) Foreign Application Priority Data
Dec. 23, 2016 (GB) ..................................... 1622085
Dec. 23, 2016 (GB) ..................................... 1622092
(Continued)

(51) Int. Cl.
*G07C 5/00* (2006.01)
*B64C 39/02* (2006.01)
(Continued)

(52) U.S. Cl.
CPC ............ *G07C 5/008* (2013.01); *B64C 39/024* (2013.01); *G01C 11/025* (2013.01);
(Continued)

(58) Field of Classification Search
USPC ........................................................ 701/31.4
See application file for complete search history.

(56) References Cited

U.S. PATENT DOCUMENTS 5,996,702 A    12/1999  Hall
7,921,000 B2   4/2011   Ohkura et al.
(Continued)

FOREIGN PATENT DOCUMENTS

WO     WO 97/01804 A1    1/1997

OTHER PUBLICATIONS

European Search Report for related Application No. 1622085.7; dated Jun. 5, 2017.
(Continued)

*Primary Examiner* — Tyler D Paige
(74) *Attorney, Agent, or Firm* — von Briesen & Roper, s.c.

(57) ABSTRACT

A surveying device is operated to measure a surface profile of a terrain of a worksite and generate surface profile data indicative of the surface profile. A work machine is operated to move along a route over the terrain in accordance with an operating parameter and generates machine operational data indicative of the operating parameter. A navigation system determines the route and generates route data. A processing unit processes the route data, machine operational data and surface profile data to generate monitored operating condition data indicative of a monitored operating condition of the machine.

15 Claims, 3 Drawing Sheets

(30) Foreign Application Priority Data

Dec. 23, 2016 (GB) ...................................... 1622094
Dec. 23, 2016 (GB) ...................................... 1622096

(51) Int. Cl.
| | | |
|---|---|---|
| *G01C 11/02* | (2006.01) | |
| *G06Q 10/06* | (2012.01) | |
| *G07C 5/08* | (2006.01) | |
| *G01C 15/00* | (2006.01) | |

(52) U.S. Cl.
CPC ....... *G01C 15/002* (2013.01); *G06Q 10/0631* (2013.01); *G07C 5/0808* (2013.01); *G07C 5/0825* (2013.01); *B64C 2201/123* (2013.01)

(56) References Cited

U.S. PATENT DOCUMENTS

| | | | |
|---|---|---|---|
| 9,481,977 B1 | 11/2016 | Clar et al. | |
| 10,829,901 B2* | 11/2020 | Wisley | E02F 9/264 |
| 2009/0063226 A1 | 3/2009 | Greiner et al. | |
| 2009/0099886 A1 | 4/2009 | Greiner et al. | |
| 2009/0112472 A1 | 4/2009 | Montgomery | |
| 2010/0198466 A1* | 8/2010 | Eklund | G05B 15/02 |
| | | | 701/50 |
| 2012/0092486 A1* | 4/2012 | McDaniel | G05D 1/0293 |
| | | | 348/118 |
| 2013/0311153 A1 | 11/2013 | Moughler et al. | |
| 2016/0076226 A1 | 3/2016 | Edara et al. | |
| 2016/0237640 A1 | 8/2016 | Carpenter et al. | |
| 2016/0282878 A1 | 9/2016 | Stratton et al. | |
| 2017/0220042 A1* | 8/2017 | Sakai | E21F 13/00 |
| 2018/0092295 A1* | 4/2018 | Sugumaran | A01C 23/007 |
| 2018/0179719 A1* | 6/2018 | Wisley | E02F 9/261 |
| 2020/0105072 A1* | 4/2020 | Wisley | B64C 39/024 |
| 2021/0094535 A1* | 4/2021 | Thompson | B60W 40/1005 |

OTHER PUBLICATIONS

European Search Report for related Application No. 1622092.3; dated Jun. 20, 2017.

European Search Report for related Application No. 1622094.9; dated Jun. 20, 2017.

European Search Report for related Application No. 1622096.4; dated Jun. 20, 2617.

International Search Report for related Application No. PCT/EP2017/084085; dated Jun. 5, 2018.

XP 55450122A—Sebastian Siebertet Al: Mobile 3D mapping for surveying earthwork projects using an Unmanned Aerial Vehicle (UAV) system.

* cited by examiner

MONITORING THE OPERATION OF A WORK MACHINE

CROSS-REFERENCE TO RELATED APPLICATION

This Application is a 35 USC § 371 US National Stage filing of International Application No. PCT/EP2017/084085 filed on Dec. 21, 2017 which claims priority under the Paris Convention to Great Britain Patent Application No. 1622085.7 filed on Dec. 23, 2016, Great Britain Patent Application No. 1622092.3 filed on Dec. 23, 2016, Great Britain Patent Application No. 1622094.9 filed on Dec. 23, 2016, and Great Britain Patent Application No. 1622096.4 filed on Dec. 23, 2016.

TECHNICAL FIELD

The present disclosure relates to methods of monitoring the operation of a work machine and systems for performing such methods.

BACKGROUND

Work machines are commonly employed to carry out a plurality of different tasks on a worksite. Such work machines may include hauling machines, such as dump trucks, off-highway trucks, mining trucks, on-highway trucks or lorries/trucks, and articulated haulers, and earthmoving machines, such as backhoes, loaders, dozers, shovels, wheeled tractor scrapers, motor graders and excavators. The worksite may be, for example, a construction site, mine, quarry, waste dump site, aggregate site or the like. The work machines may be autonomously, semi-autonomously or manually operated to perform the tasks.

The work machines may be monitored by a monitoring system in order to determine their operating conditions and performance when performing the tasks. United States Patent Publication No. 20160076226 discloses one such system in which a work machine comprises a plurality of sensors associated with the work machine for generating signals indicative of the operating conditions of the machine. The system is configured to determine the performance characteristics of the work machine based upon the signals and determine whether the work machine meets certain performance thresholds. However, using the sensors of United States Patent Publication No. 20160076226 may be relatively expensive and complex and such an arrangement may have relatively high computational requirements.

SUMMARY

The present disclosure is directed towards a method of monitoring the operation of at least one work machine comprising: generating actual or simulated surface profile data indicative of a simulated or actual surface profile of a simulated or actual terrain of a simulated or actual worksite; receiving actual or simulated route data indicative of an actual or simulated route of at least one actual or simulated work machine moving over the terrain; receiving actual or simulated machine operational data indicative of at least one actual or simulated operating parameter of the at least one work machine whilst moving along the route; and processing the route data, machine operational data and surface profile data to generate monitored operating condition data indicative of at least one monitored operating condition of the at least one work machine moving along the route in accordance with the at least one operating parameter.

The present disclosure provides a method of monitoring the operation of at least one work machine comprising: operating at least one surveying device to measure a surface profile of a terrain of a worksite and generate actual surface profile data indicative of the surface profile; operating at least one work machine to move along a route over the terrain in accordance with at least one actual operating parameter and generating actual machine operational data indicative of the at least one actual operating parameter; operating a navigation system to determine the route and generate actual route data indicative of the route; and operating a processing unit to process the actual route data, actual machine operational data and actual surface profile data to generate monitored operating condition data indicative of at least one monitored operating condition of the at least one work machine moving along the route in accordance with the at least one actual operating parameter.

The present disclosure provides a system for monitoring at least one work machine and comprising: at least one work machine; at least one surveying device configured to measure a surface profile of a terrain of a worksite and generate actual surface profile data indicative of the surface profile; a navigation system configured to determine the route of the at least one work machine as it moves over the terrain and generate actual route data indicative of the route; at least one sensor configured to generate actual machine operational data indicative of at least one actual operating parameter of the at least one work machine whilst moving along the route; and a processing unit configured to process the actual route data, actual machine operational data and actual surface profile data to generate monitored operating condition data indicative of at least one monitored operating condition of the at least one work machine moving along the route in accordance with the at least one actual operating parameter.

The present disclosure provides a method of monitoring the operation of at least one work machine comprising: operating at least one surveying device to measure a surface profile of a terrain of a worksite and generate actual surface profile data indicative of the surface profile; receiving route data indicative of a route of at least one work machine moving over the terrain; receiving simulated machine operational data indicative of at least one simulated operating parameter of the at least one work machine whilst moving along the route, processing the route data, simulated machine operational data and actual surface profile data to generate monitored operating condition data indicative of at least one monitored operating condition of the at least one work machine moving along the route in accordance with the at least one simulated operating parameter.

The present disclosure provides a system for monitoring at least one work machine and comprising: at least one surveying device configured to measure a surface profile of a terrain of a worksite and generate actual surface profile data indicative of the surface profile; a computer system comprising a processing unit and configured to: determine route data indicative of a route of at least one work machine moving over the worksite; determine simulated machine operational data indicative of at least one simulated operating parameter of the at least one work machine whilst moving along the route; and process the route data, simulated machine operational data and actual surface profile data to generate monitored operating condition data indicative of at least one monitored operating condition of the at least one work machine moving along the route in accordance with the at least one simulated operating condition.

The present disclosure provides a method of monitoring the operation of at least one work machine comprising: operating at least one surveying device to measure a surface profile of a terrain of a worksite and generate actual surface profile data indicative of the surface profile; receiving simulated route data indicative of a simulated route of at least one work machine moving over the terrain; receiving simulated machine operational data indicative of at least one simulated operating parameter of the at least one work machine moving along the simulated route; processing the simulated route data, simulated machine operational data and actual surface profile data to generate monitored operating condition data indicative of at least one monitored operating condition of the at least one work machine moving along the simulated route in accordance with the at least one simulated operating parameter; operating at least one work machine to move along an actual route over the terrain in accordance with at least one actual operating parameter and generating actual machine operational data indicative of the at least one actual operating parameter; operating a navigation system to determine the route and generate actual route data indicative of the actual route; and processing the simulated route data and actual route data and updating the simulated route data based upon the actual route data, and/or processing the simulated machine operational data and actual machine operational data and updating the simulated machine operational data based upon the actual machine operational data.

The present disclosure provides a system for monitoring at least one work machine and comprising: at least one surveying device configured to measure a surface profile of a terrain of a worksite and generate actual surface profile data indicative of the surface profile; a computer system comprising a processing unit and configured to: determine simulated route data indicative of a simulated route of at least one work machine moving over the terrain; determine simulated machine operational data indicative of at least one simulated operating parameter of the at least one work machine whilst moving along the simulated route; and process the simulated route data, simulated machine operational data and actual surface profile data to generate monitored operating condition data indicative of at least one monitored operating condition of the at least one work machine moving along the route in accordance with the at least one simulated operating condition; at least one work machine configured to move along an actual route over the terrain; a navigation system configured to determine the actual route of the at least one work machine as it moves over the terrain and generate actual route data indicative of the route; and at least one sensor configured to generate actual machine operational data indicative of at least one actual operating parameter of the at least one work machine whilst moving along the route; wherein the computer system is configured to process the simulated route data and actual route data and updating the simulated route data based upon the actual route data, and/or process the simulated machine operational data and actual machine operational data and updating the simulated machine operational data based upon the actual machine operational data.

The present disclosure provides a method of monitoring the operation of at least one work machine comprising: operating at least one surveying device to measure a surface profile of a terrain of a worksite and generate actual surface profile data indicative of the surface profile; receiving route data indicative of a route of at least one work machine moving over the terrain; receiving machine operational data indicative of at least one simulated operating parameter of the at least one work machine whilst moving along the route, processing the route data, machine operational data and actual surface profile data to generate simulated monitored operating condition data indicative of at least one monitored operating condition of the at least one work machine moving along the route in accordance with the at least one operating parameter, the simulated monitored operating condition data being determined based upon a machine model and/or simulation algorithm; operating at least one work machine to move along the route over the terrain in accordance with at least one actual operating parameter and generating actual machine operational data indicative of the at least one actual operating parameter; operating at least one sensor to generate actual monitored operating condition data indicative of the at least one monitored operating condition as the at least one work machine moves along the route in accordance with the at least one actual operating parameter; and processing the actual monitored operating condition data and simulated monitored operating condition data and updating the machine model and/or simulation algorithm based upon the actual monitored operating condition data and simulated monitored operating condition data.

The present disclosure provides a system for monitoring at least one work machine and comprising: at least one surveying device configured to measure a surface profile of a terrain of a worksite and generate actual surface profile data indicative of the surface profile; a computer system comprising a processing unit and configured to: determine route data indicative of a route of at least one work machine moving over the terrain; determine machine operational data indicative of at least one operating parameter of the at least one work machine whilst moving along the route; and process the route data, machine operational data and actual surface profile data to generate simulated monitored operating condition data indicative of at least one monitored operating condition of the at least one work machine moving along the route in accordance with the at least one operating parameter, the simulated monitored operating condition data being determined based upon a machine model and/or simulation algorithm; at least one work machine configured to move along the route over the terrain; at least one sensor configured to: generate actual machine operational data indicative of at least one actual operating parameter of the at least one work machine whilst moving along the route; and generate actual monitored operating condition data indicative of the at least one monitored operating condition as the at least one work machine moves along the route in accordance with the at least one actual operating parameter; and wherein the computer system is configured to process the actual monitored operating condition data and simulated monitored operating condition data and updating the machine model and/or simulation algorithm based upon the actual monitored operating condition data and simulated monitored operating condition data.

The method may comprise operating at least one work machine and/or generating an alert for an operator based upon the monitored operating condition data and/or displaying the monitored operating condition data on a display.

The monitored operating condition data may be generated based upon at least one machine model and/or simulation algorithm. The at least one work machine may comprises at least one machine structure and the monitored operating data is indicative of at least one monitored operating condition of the at least one machine structure. The at least one monitored operating condition may comprise a monitored stress and/or strain magnitude and/or rate experienced by at least one machine structure as the at least one work machine moves along the route. The at least one work machine and/or at least one further work machine may be operated to remove or adjust the terrain event and/or below a machine speed limit. The machine speed limit may be determined based upon the monitored stress and/or strain magnitude and/or rate for the terrain event and the associated event threshold value.

The method may further comprise determining an expected lifetime of the at least one machine structure based upon the monitored operating condition data and a maximum lifetime stress and/or strain accumulation or rate associated with the at least one machine structure. The method may further comprise generating an alert indicative of at least one machine structure requiring repair and/or replacement, the alert being generated if the monitored stress and/or strain magnitude and/or rate meets a threshold magnitude and/or rate. The method may further comprise generating an alert indicative of a service schedule based upon the monitored stress and/or strain magnitude and/or rate. The method may further comprise: assigning a worksite duty segment to the worksite based upon the monitored stress and/or strain magnitude and/or rate meeting or falling within a range of magnitudes and/or rates of change of stress and/or strain associated with the worksite duty segment; and generating an alert indicative of the worksite duty segment; and/or generating an alert indicative of whether the at least one work machine is matched to the worksite duty segment based upon data associated with a plurality of work machines, a plurality of worksite duty segments and the suitability of each of the plurality of work machines to each of the plurality of worksite duty segments. The method may further comprise determining a warranty period of the at least one work machine based upon: the monitored operating condition data; the expected lifetime of at least one machine structure; a maximum accumulation of stress and/or strain on at least one machine structure; a maximum magnitude of stress and/or strain on at least one machine structure; and/or the worksite duty segment assigned to the worksite.

At least one terrain event may be identified and at least one work machine is operated based upon the identified terrain event and/or an alert is generated. The at least one terrain event may be identified at a location of the terrain where: at least one monitored operating condition exceeds an event threshold value; the monitored stress and/or strain magnitude and/or rate on at least one machine structure exceeds an event threshold value; the rate of change of, or a summation of, simulated stress and/or strain rate exceeds an event threshold value; and/or the magnitude and/or rate of change of a gradient of the surface profile is above an event threshold value, the magnitude and/or rate of change of the gradient being determined by processing the actual surface profile data.

The simulated machine operational data may be: based upon at least one input by an operator specifying the at least one simulated operating parameter; retrieved from an optimal operating condition database on a memory containing at least one optimal operating condition associated with a plurality of known surface profiles and routes, the retrieval being based upon a comparison between the route over the surface profile of the terrain and the known surface profiles; and/or retrieved from a look-up table of at least one optimal operating condition associated with a value and/or range of inclinations of terrain, the retrieval being based upon a comparison between the route over the surface profile of the terrain and the value and/or range of inclinations of terrain. The machine operational data may be determined by operating at least one work machine to move along a route over the terrain in accordance with at least one actual operating parameter and generating actual machine operational data indicative of the at least one actual operating parameter. The method may further comprise reprocessing the updated simulated route data and/or the updated simulated machine operational data, and the actual surface profile data, to generate monitored operating condition data indicative of at least one monitored operating condition of the at least one work machine moving along the actual and/or simulated route in accordance with the at least one actual and/or simulated operating parameter. The at least one monitored operating condition may be different to the at least one operating parameter.

The method may comprise: processing the simulated machine operational data and the actual machine operational data and determining whether at least part of the simulated machine operational data and at least part of the actual machine operational data differ and/or differ by at least a machine operational data threshold; and processing the at least part of the simulated machine operational data to reflect at least part of the actual machine operational data if at least part of the simulated machine operational data and at least part of the actual machine operational data differ and/or differ by at least a machine operational data threshold. The method may comprise: processing the actual monitored operating condition data and simulated monitored operating condition data and determining whether the simulated monitored operating condition data differs from the actual monitored operating condition data along all or part of the route by at least a monitored operating condition threshold value; and processing the machine model and/or simulation algorithm to update the machine model and/or simulation algorithm if the simulated monitored operating condition data differs from the actual monitored operating condition data along all or part of the route by at least a monitored operating condition threshold value.

The route data may comprise: actual route data collected by a navigation system and indicative of a route of at least one work machine over the terrain; or simulated route data indicative of a simulated route of at least one work machine over the terrain. The simulated route data may be determined: based upon at least one input by an operator specifying the route; by retrieving previously generated actual or simulated route data;

and/or by processing the surface profile data to determine an optimal route along the terrain. The actual route may be the same as or different to the simulated route. The method may further comprise: processing the simulated route data and the actual route data and determining whether at least part of the simulated route and at least part of the actual route differ and/or differ by at least a route data threshold; and processing the at least part of the simulated route data to reflect at least part of the actual route data if at least part of the simulated route and at least part of the actual route differ and/or differ by at least a route data threshold.

The method may further comprise operating at least one surveying device to re-measure at least part of the surface profile of the terrain and updating the actual surface profile data based upon the re-measurement. The machine model and/or simulation algorithm may comprise at least one structural parameter associated with at least one machine structure of the at least one work machine. Updating the machine model and/or simulation algorithm may comprise adjusting the at least one structural parameter such that the actual and simulated monitored operating condition data are the same or fall within a predetermined range of one another. The method may further comprise reprocessing the route data, machine operational data and actual surface profile data to generate simulated monitored operating condition data indicative of the at least one monitored operating condition of the at least one work machine moving along the route in accordance with the at least one operating parameter, the simulated monitored operating condition data being determined based upon the updated machine model and/or simulation algorithm.

The system may further comprise a computer system and/or a machine control system. The computer system may comprise the processing unit. The machine control system may be for controlling the operation of the at least one work machine. The computer system may be separate from or integrated with the machine control system. The at least one surveying device: may be separate from or integrated with the at least one work machine; may comprise at least one of a manned aircraft, an unmanned aerial vehicle and/or a manned or unmanned dedicated surface profile scanning vehicle; and/or may obtain the actual surface profile data via photogrammetry, radar, LIDAR, laser scanners, video systems and/or audio systems. The system may further comprise at least one work machine and a machine control system for controlling the operation of the at least one work machine.

BRIEF DESCRIPTION OF DRAWINGS

The present disclosure is described in conjunction with the appended figures. It is emphasized that, in accordance with the standard practice in the industry, various features are not drawn to scale. In fact, the dimensions of the various features may be arbitrarily increased or reduced for clarity of discussion.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention, it being understood that various changes may be made in the function and arrangement of elements, including combinations of features from different embodiments, without departing from the scope of the invention.

Specific details are given in the following description to provide a thorough understanding of the embodiments. However, it will be understood by one of ordinary skill in the art that embodiments may be practised without these specific details. For example, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof.

When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The present disclosure generally relates to a method and system for monitoring the operation of at least one work machine on a worksite. In particular, the system may comprise at least one surveying device for measuring the three-dimensional surface profile of the worksite. A computer system may receive data indicative of the surface profile and process the data to perform a simulation of the work machine manoeuvring over the worksite. The system may also comprise a work machine control system configured to monitor at least one operating parameter related to the operation of the work machine. The computer system may receive data relating to the at least one operating parameter and perform the simulation in accordance with the at least one operating parameter. The simulation may be used to monitor at least one operating condition of the work machine other than the at least one operating parameter. Thus the method and system differ from United States Patent Publication No. 20160076226, which does not provide for using predictive modelling and/or use of measured data in such predictive modelling.

Figure 1:
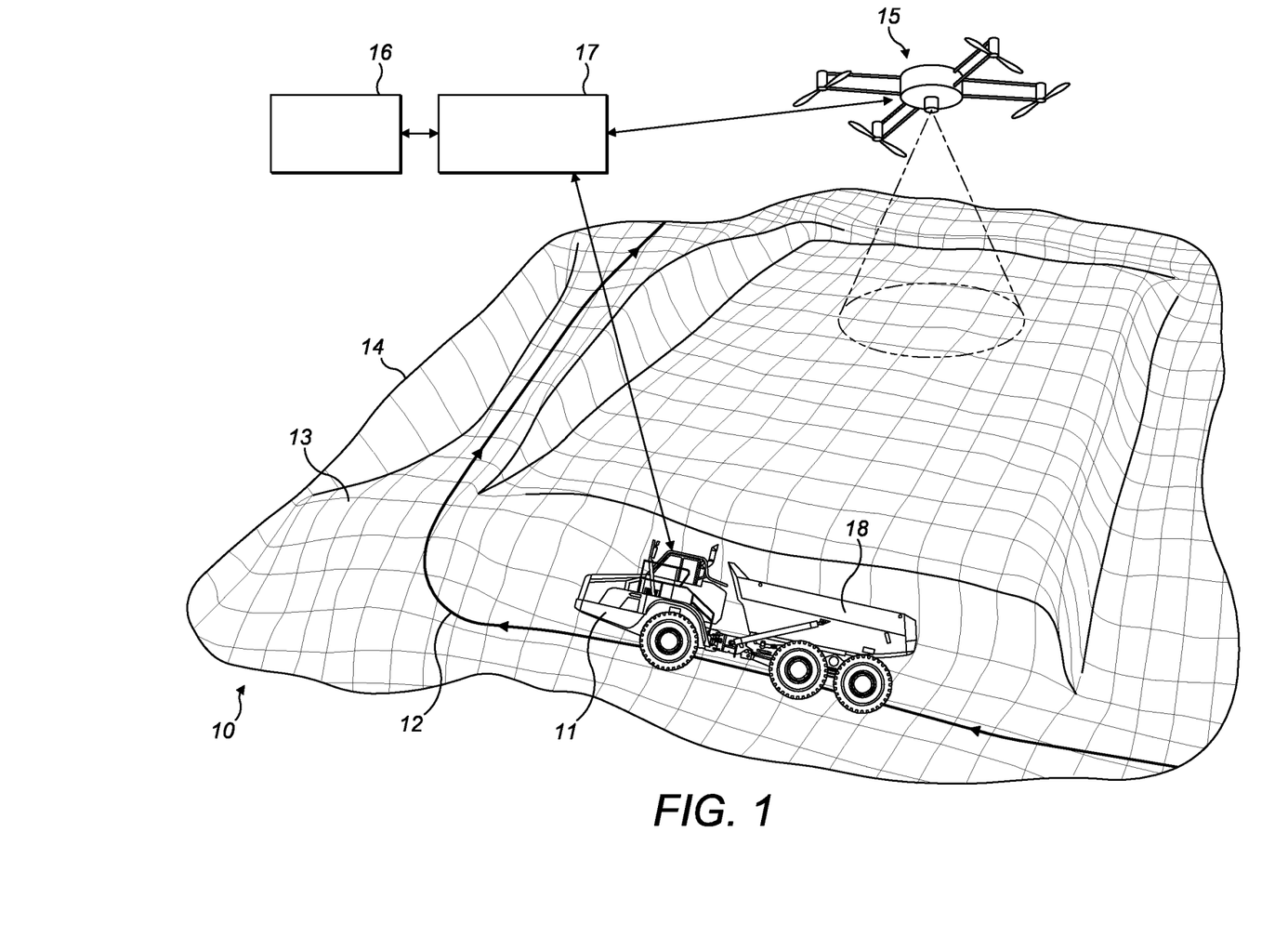
FIG. 1 illustrates an exemplary system of the present disclosure.

FIG. 1 illustrates an embodiment of a system 10 of the present disclosure comprising at least one work machine 11 moving along a route 12 over a terrain 13 of a worksite 14. The system 10 may further comprise at least one surveying device 15 for measuring the three-dimensional surface profile of the worksite 14. The at least one surveying device 15 and at least one work machine 11 may be configured to communicate and/or transfer data with a computer system 16 via a communication system 17.

The Worksite and Work Machine(s)

The worksite 14 may comprise an area within which earth or other material is moved and/or manipulated and may be an off-road area. The illustrated worksite 14 is a mine, although in other embodiments the worksite 14 may comprise a construction site, an open or closed mine, quarry, waste dump site, aggregate site or the like. The terrain 13 may comprise the ground of the worksite 14 over which the work machine 11 travels and the route 12 may comprise the path of the work machine 11 over the terrain 13. The route 12 may comprise a path from a first location to a second location.

The at least one work machine 11 may be any type of work machine 11 suitable for the worksite 14 and the system 10 may comprise a plurality of the same or different work machines 11. The illustrated work machine 11 is an articulated hauler, although in other embodiments the work machine(s) 11 may comprise hauling machines, such as dump trucks, on-highway trucks or lorries and off-highway trucks, and/or earth-moving or material handling machines, such as backhoes, wheel tractor scrapers, loaders, dozers, shovels, drilling machines, motor graders, forestry machines and excavators.

The at least one work machine 11 may also comprise at least one machine structure, which may refer to any physical component, system and/or sub-system of the work machine 11, such as the frames, chassis, ground engaging members (e.g. wheels or tracks), suspension systems (e.g. suspension springs, beams, hydraulic cylinders, connections, axles and the like), engine components (e.g. fuel injectors, valves, cylinders, crankshaft, cooling system, turbochargers, superchargers, batteries, electrical systems and the like), powertrain (e.g. transmissions, torque converters, shafts, differentials and the like), the at least one work tool 18 (e.g. dump bodies, buckets, hydraulic systems, electrical systems and the like), rigid and flexible linkages and the like. In particular, the at least one work machine 11 may comprise an engine system configured to drive at least one ground engaging arrangement to move the at least one work machine 11 along the route 12. The at least one ground engagement member may comprise at least one wheel, tracks or the like. The engine system may comprise at least one power unit (e.g. a internal combustion engine, electric motor and/or hydraulic motor) configured to drive a powertrain. The powertrain may comprise at least one transmission configured to drive at least one output shaft or the like for driving the at least one ground engagement member.

The work machine 11 may comprise at least one work tool 18 for performing work on the worksite 14. The form of the at least one work tool 18 may depend upon the type of the work machine 11. In the case of a hauling machine the at least one work tool 18 may comprise a dump body or other arrangement for holding bulk material during transportation. The dump body may be pivotable to allow ejection of the material or may comprise an actuatable ejector member within the dump body to enable ejection of the material. In the case of an earth-moving or material handling machine, the at least one work tool 18 may be of any suitable type for digging, lifting or otherwise manipulating material of the worksite 14, such as a bucket, shovel, conveyor or the like.

If the work machine 11 comprises a hauling machine the first location may be a location on the worksite 14 at which the hauling machine is loaded with material and the second location may be a location on the worksite 14 at which the hauling machine ejects the material. The route 12 may therefore be a "haul route" and the at least one work machine 11 may travel over the haul route 12a plurality of times in order to transfer a plurality of loads of material between the first and second locations. If the work machine 11 comprises an earth-moving or material handling machine the first location may be the location at which the work machine 11 picks up material from the terrain 13 and the second location may be the location at which the earth-moving machine deposits the material into a hauling machine. A haul route may be a route 12 between at least one loading location and at least one ejection location. Alternatively, the material handling machine may also travel along the haul route, for example between a first location, at which the material handling may be parked or stored when not in use, and a second location, where the material handling machine may perform work. In the present disclosure two routes 12 may be considered to be the same if they are within a threshold distance of one another or both routes 12 fall within a boundary of one another. Such a threshold distance and/or boundary may be preset and may be stored in the computer system 16. For example, the threshold distance and/or boundary may be less than approximately 30 meters, less than approximately 20 meters, less than approximately 10 meters, less than approximately 5 meters and/or less than approximately 1 meter.

Figure 2:
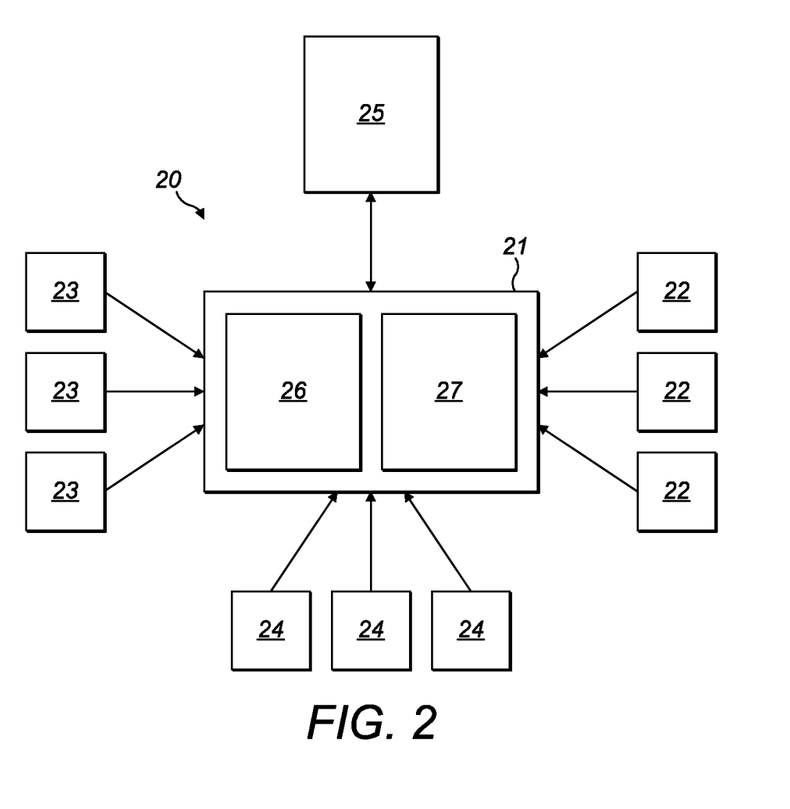
FIG. 2 illustrates an exemplary machine control system of a work machine of the system of FIG. 1.

The work machine 11 may comprise a machine control system 20 as schematically illustrated in FIG. 2. The machine control system 20 may comprise a controller 21 communicatively connected (via a wired or wireless connection) to at least one input 22, at least one output 23, at least one sensor 24 and at least one machine communication module 25. The controller 21 may be of any suitable known type and may comprise an engine control unit (ECU) or the like. The controller 21 may comprise a memory 26, which may store instructions or algorithms in the form of data, and a processing unit 27, which may be configured to perform operations based upon the instructions. The memory 26 may comprise any suitable computer-accessible or non-transitory storage medium for storing computer program instructions, such as RAM, SDRAM, DDR SDRAM, RDRAM, SRAM, ROM, magnetic media, optical media and the like. The processing unit 27 may comprise any suitable processor capable of executing memory-stored instructions, such as a microprocessor, uniprocessor, a multiprocessor and the like.

The controller 21 may further comprise a graphics processing unit for rendering objects for viewing on a display. The controller 21 may receive data from at least one input 22, at least one sensor 24 and/or the machine communication module 25 and perform operations based upon the instructions, such as by sending data to an output 23, at least one sensor 24 and/or the machine communication module 25, performing calculations or carrying out logic-based tasks.

The machine communication module 25, discussed in further detail below, may be configured to transfer data between the machine control system 20 and the communication system 17, computer system 16, surveying device 15 and/or another machine control system 20 of another work machine 11.

The at least one input 22 may comprise a device for operation by, or receiving at least one input from, an operator for controlling the work machine 11, such as a gear selector, a steering wheel, a brake pedal, a speed selector (e.g. an accelerator pedal), a work tool manipulator (e.g. a joystick), a dashboard button and the like. The at least one input 22 may define at least one operating condition according to which the at least one work machine 11 is operated. The at least one input 22 may relate to, for example, a gear selection, movement of the steering wheel, a braking command, a speed command, a work tool 18 manipulation, a button press or the like.

The at least one output 23 may comprise a device for operating the machine in accordance with the at least one input 22. The at least one output 23 may be operated under at least one operating condition, which may result due to the at least one operating condition of the at least one input 22. Exemplary outputs 23 include the transmission, the engine or any part thereof, a valve system, a fuel injection system, an electric, pneumatic and/or hydraulic system for controlling the work machine 11 and/or at least one work tool 18 (particularly a dump body, ejector body or conveyor), a steering mechanism, brake actuators, a differential lock, a display for displaying information to an operator, lights and the like. The at least one operating condition implemented by the at least one output 23 may be any type of operating condition of the work machine 11, such as, for example, a machine speed, a direction of travel, an engine speed, a powertrain load, a braking or retarding load, gear selection or transmission ratio, work tool 18 positioning, work tool 18 manipulation (e.g. opening or closing shears, a bucket and the like), a payload measurement (e.g. the load caused by material in a dump body, bucket or the like), fluid pressure in hydraulic circuits (e.g. for controlling the work tool 18), electric current or voltage levels and the like.

The at least one sensor 24 may comprise any device configured to determine and monitor at least one actual operating condition of the work machine 11 and generate actual machine operational data indicative of the at least one actual operating condition. The at least one actual operating condition may comprise at least one operating condition as described above or indicative of the state of the work machine 11 or a component, system or subsystem thereof. For example, the at least one sensor 24 may be configured to sense operation of at least one input 22 or the effect of the operation of at least one output 23.

The at least one sensor 24 may be configured to determine the at least one operating condition of at least one machine structure of the work machine 11. The at least one sensor 24 may comprise a strain sensor for determining the stress and/or strain on a machine structure (e.g. the stresses experienced by a beam of a suspension system), a load sensor for determining the load upon a machine structure (e.g. a sensor positioned to determine the payload in a dump body), a temperature sensor for determining the temperature of a machine structure (e.g. the temperature of hydraulic fluid or brakes), a speed sensor for determining the speed/velocity of a machine structure (e.g. an engine output speed sensor for detecting the rotational velocity of at least one output shaft from the engine), an inclination sensor for determining the three-dimensional inclination of the at least one work machine 11 on the terrain 13 and generating inclination data indicative of the inclination, a position sensor for determining the position of a machine structure (e.g. the position of parts of the at least one work tool 18), an accelerometer for measuring the acceleration experienced by at least one machine structure and/or the at least one work machine 11 due to vibrations and/or a load, and the like. In particular, at least one accelerometer may be arranged to measure the load input to at least one ground engaging means.

The at least one sensor 24 may comprise a dump body monitor for determining the status of the dump body, if present on the at least one work machine 11. In particular, the dump body monitor may comprise an inclination sensor for measuring the inclination of a pivotable dump body, a position sensor for determining the position of an ejector member of a dump body with an ejector and/or a load sensor for determining the load of material, if any, in the dump body.

The system 10 may further comprise a navigation system for determining the position of the at least one work machine 11 and generating actual route data indicative of its position on the worksite 14. The navigation system may determine the location of the at least one work machine 11 on the Earth's surface and/or may determine the location of the at least one work machine 11 relative to a reference position on the worksite 14. The actual route data may comprise the position of the work machine 11 in two dimensional coordinates X, Y representing its position on a plane parallel to the surface of the worksite 14. The actual route data may also comprise a third dimensional coordinate Z indicative of the "height" of the machine relative to a reference height. The actual route data may comprise a plurality of coordinates indicating the position of the at least one work machine 11 as it moves over the terrain 13 and the plurality of coordinates may define the route 12. The plurality of coordinates may be generated by sampling the position of the at least one work machine 11 at time intervals.

The navigation system may comprise any suitable navigation system. In particular, the at least one sensor 24 may comprise a position sensor operable to determine the position of the work machine 11 via a global navigation satellite system, such as global positioning system (GPS), or via triangulation with communication masts. Alternatively, the navigation system may be embodied in the machine control system 20, which may substantially continuously monitor at least the speed and direction of the work machine 11 as it moves over the worksite 14 between a first and second location. The coordinates of the first location may be input into the machine control system 20 and stored on the memory. Based upon the monitored speed and direction of the work machine 11 the machine control system 20 may be operable to determine the coordinates of the second location.

The Surveying Device(s)

The at least one surveying device 15 may be configured to measure the three-dimensional surface profile or topography of the terrain 13 of the worksite 14 and generate actual surface profile data indicative of the actual surface profile. In particular, the at least one surveying device 15 may be configured to generate actual surface profile data in the form of a point cloud of the terrain 13. The actual surface profile data may be processed, such as by extrapolation between points of a point cloud, to create a "virtual map" and/or to perform further operations, as discussed below. The at least one surveying device 15 may utilise any method, sensor, instrumentation or other apparatus known in the art to obtain the actual surface profile data, such as photogrammetry, radar, LIDAR, laser scanners, video systems, audio systems or a combination thereof.

The at least one surveying device 15 may comprise a device separate from the at least one work machine 11. The at least one surveying device 15 may comprise a surveying device communication module configured to communicate with, and send the actual surface profile data to, the at least one work machine 11, computer system 16 and/or communication system 17. The at least one surveying device 15 may comprise an aerial platform, such as a manned aircraft or unmanned aerial vehicle ("UAV"), or a terrestrial (i.e. land based) platform, such as a dedicated surface profile scanning vehicle (manned or unmanned).

Alternatively, the at least one surveying device 15 may be partly or entirely embodied in the at least one work machine 11. For example, the at least one sensor 24 may comprise instrumentation for generating the actual surface profile data as the at least one work machine 11 moves over the worksite 14. The instrumentation may operate according to any suitable surface profiling method, such as video, laser scanning, imaging and the like.

The system 10 may comprise a plurality of surveying devices 15, which may be of different types and use different surveying methods. In particular, at least one surveying device 15 may comprise a UAV comprising a photogrammetric system and at least one surveying device 15 may be a LIDAR system located on at least one work machine 11. The UAV may generate initial actual surface profile data which may be updated with actual surface profile data from the LIDAR system as the work machine 11 moves material and alters the surface profile of the terrain 13.

The actual surface profile data collected by the at least one surveying device 15 may comprise at least one reference position associated with it such that the actual route data and actual surface profile data may be referenced to one another. For example, the actual surface profile data and actual route data may comprise at least one coordinate in the form of a geographic latitude and longitude of the Earth's surface. As a result, the actual route data may be accurately mapped to a location on the actual surface profile data such that the position of the work machine 11 on the worksite 14 may be determined. The at least one surveying device 15 may utilise the navigation system and/or other positioning system for determining the position of the at least one surveying device 15 as it gathers the actual surface profile data such that the at least one reference position can be determined.

The Computer System

The computer system 16 may be configured to receive actual surface profile data, actual machine operating condition data and/or the actual route data and perform simulations of the operation of the at least one work machine 11. The computer system 16 may be separate from the work machine 11 and at least one surveying device 15 as illustrated (e.g. by being located in a separate housing) and they may communicate data within one another via the communication system 17. The computer system 16 may be located in a monitoring station on the worksite 14 or at a station remote to the worksite 14. For example, the computer system 16 may be located in a central server and database of the operating company of the worksite 14, the at least one surveying device 15 and/or the at least one work machine 11. Alternatively, the computer system 16 may be located on the at least one work machine 11 (separately or integrally with the machine control system 20) and/or the at least one surveying device 15. In particular, the computer system 16 as described herein may be embodied as the machine control system 20. Thus any references herein to the performance of a method or operation on the computer system 16 may also be considered to be references to the performance of a method or operating on the machine control system 20 and vice-versa.

The computer system 16 may comprise any known computer system 16, such as a personal computer, laptop, tablet computer, server, smartphone and the like. In particular, the computer system 16 may comprise a memory storing instructions or algorithms as memory data and a processing unit, which may be configured to perform operations based upon the instructions. The memory may comprise any suitable computer-accessible or non-transitory storage medium for storing computer program instructions, such as RAM, SDRAM, DDR SDRAM, RDRAM, SRAM, ROM, magnetic media, optical media and the like. The processing unit may comprise any suitable processor capable of executing memory-stored instructions, such as a microprocessor, uniprocessor, a multiprocessor and the like. The computer system 16 may comprise a plurality of input and/or output devices for providing an input to, or receiving an output from, the processing unit. Exemplary input and output devices include displays, keyboards, mice, joysticks, touch screens, buttons, external network interfaces for transferring information to and/or from an external network such as the Internet, other communication ports (e.g. universal serial bus ports), speakers, lights and the like. The computer system 16 may further comprise a graphics processing unit for rendering objects for viewing on a display. The computer system 16 may comprise a computer system communication module for communication with the at least one work machine 14, at least one surveying device 15 and/or the communication system 17.

The computer system 16 may comprise data, instructions or algorithms stored on the memory, for example in a database, related to a machine simulator, which may be processed by the processing unit to simulate the operation of the at least one work machine 11 in accordance with at least one operating parameter. In the present disclosure the term "operating parameter" may refer to an actual or simulated operating condition according to which the work machine 11 is simulated in the machine simulator. In the present disclosure "simulate" may refer to elements (e.g. routes, parameters etc) involved in producing and running a computer model, whereas "actual" may refer to the elements involved in actually operating at least one work machine 11. The machine simulator may be configured to construct a virtual model of the at least one work machine 11, simulate the operation of the at least one work machine 11 in accordance with at least one operating parameter and analyse the operating conditions of the at least one work machine 11 during the simulated operation. The machine simulator may comprise a multibody system dynamics simulator and suitable machine simulator software for performing the machine simulation on the computer system 16 may include any multibody dynamics simulation software.

The data, instructions or algorithms related to the machine simulator stored on the memory may be related to at least one of:

Actual surface profile data associated with at least one worksite 14, which may be collected as described above from the at least one surveying device 15;

Actual route data associated with at least one work machine 11, which may be collected as described above from the navigation system;

Actual machine operational data associated with at least one work machine 11, which may be collected as described above from the machine control system 20;

Simulated surface profile data, which may comprise various operator created simulated surface profiles indicative of certain events. For example, a plurality of surface profiles may be stored and each surface profile may comprise a flat surface with a bump and/or a continuous grade of different magnitudes;

Simulated route data, which may comprise a simulated route of a work machine 11 between first and second locations either over an actual surface profile or over a simulated surface profile;

Simulated machine operational data, which may comprise at least one simulated operating parameter for operating the work machine over an actual or simulated route over an actual or simulated surface profile. For example, the simulated operating condition may comprise a machine speed specified by a user of the computer system 16;

Machine model data indicative of the design and structural layout of at least one work machine 11 and of at least one machine structure thereof. The machine model may be an analytical model of the at least one work machine 11 and the memory may store a plurality of machine models, each for one of a plurality of different types of work machine 11. The machine model may be configured to be electronically simulated in the machine simulator in accordance with at least one operating parameter such that the machine simulator is operable to generate simulated performance data indicative of at least one operating condition of the machine. The at least one operating parameter may be derived from actual or simulated machine operational data. The machine model may be a design machine model (e.g. a computer aided design (CAD) generated machine model) and may comprise representations of at least one machine structure, substantially all of the machine structures or all of the machine structures of the work machine 11. The machine model may be based upon a three-dimensional representation of the work machine 11 and all of the machine structures relevant to a certain simulation. The machine model may be suitable to undergo finite element analysis (FEA) to determine at least one stress and/or strain on at least one machine structure. The machine model may comprise a plurality of flexbodies and/or may be a multibody system dynamics machine model. For example, if the simulation is directed to determining the stresses experienced by the suspension system of the work machine 11, the machine model may comprise computer generated representations of the suspension system and simulations of the loads experienced by the simulations under certain operating parameters;

Model parameter data indicative of at least one structural parameter for the machine model. The at least one structural parameter may relate to and/or define the physical or structural properties of at least one machine structure. The at least one structural parameter may, for example, be the spring constant defining a model of a suspension system, parameters defining bearing stiffness, stiffness constants or matrices defining the behaviour of a machine structure under a load and the like; and/or A simulation algorithm configured to operate the machine simulation. The simulation algorithm may be configured to receive simulated or actual surface profile, machine position and machine operational data and simulate the operation of the machine model (in accordance with the at least one structural parameter) of at least one work machine 11 moving over the actual or simulated surface profile in accordance with at least one actual or simulated operating parameter along an actual or a simulated route. The simulation algorithm may use the machine model to determine the effect of the simulated movement on at least one machine structure and thereby simulate at least one operating condition associated with the at least one machine structure. The simulation algorithm and machine model may be integrated with one another.

The Communication System

The communication system 17 may be configured to enable communication between the machine control system(s) 20 of the at least one work machine 14, the at least one surveying device 15, the computer system 16 and/or another machine control system 20 of another work machine 11. The communication system 17 and associated machine, computer system and surveying device communication modules 25 may comprise any type suitable apparatus for communication therebetween, particularly a wireless or wired network. Exemplary wireless networks include a satellite communication network, broadband communication network, cellular, Bluetooth, microwave, point-to-point wireless, point-to-multipoint wireless, multipoint-to-multipoint wireless, Wireless Local Service (WiFi Dongle), Dedicated Short-Range Communications (DSRC) or any other wireless communication network. Exemplary wired networks include Ethernet, fibre optic, waveguide or any other suitable wired connection.

As discussed above, the at least one work machine 11 may comprise the computer system 16 and/or the at least one surveying device 15, which may form part of the machine control system 20. Therefore, the system 10 may not comprise the communication system 17 or the communication system 17 may be embodied as connections between the aforementioned components of the machine control system 20.

System Operation

Figure 3:
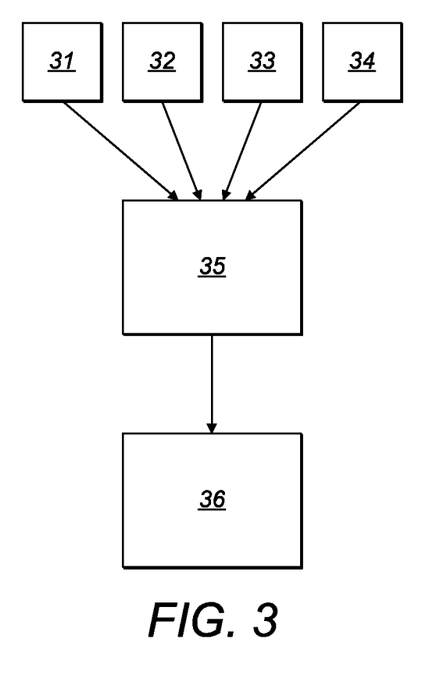
FIG. 3 is a flow diagram of a method of operating the system of the present disclosure.

An exemplary method 30 of operating the system 10 is illustrated in FIG. 3. The method 30 may comprise at least one surface profile generating step 31, machine position generating step 32, operating parameter generating step 33, machine model retrieval step 34, simulation step 35 and analysis step 36.

In the surface profile generating step 31 actual and/or simulated surface profile data may be generated. At least one surveying device 15 may travel over the worksite 14, measure the topography of the terrain 13 with reference to at least one reference location on the worksite 14 and generate point cloud data indicative of the actual three-dimensional surface profile of the worksite 14. Therefore, actual surface profile data may be generated. The actual surface profile data may be communicated to the work machine 11 and/or computer system 16, for example via the communication system 17. The at least one surveying device 15 may measure at least the topography of the route 12, which may be a predetermined route 12 for movement of at least one work machine between first and second locations.

However, instead, the at least one surveying device 15 may measure the topography of the entire terrain 13 rather than just a certain route 12. For example, the worksite 14 may be defined as being within boundaries, for example having a polygonal shape. The boundaries may include a plurality of haul routes located within them. The at least one surveying device 15 may be controlled to travel between the boundaries to generate point cloud data indicative of the entire surface profile in the worksite 14.

Alternatively, the surface profile generating step 31 may comprise generating simulated surface profile data and/or retrieving previously generated simulated surface profile data from a memory, such as the memory of the computer system 16 or machine control system 20. The simulated surface profile data may be randomly generated, operator generated (e.g. explicitly specified by an operator) or may be based upon actual surface profile data from a historical worksite 14. The memory may store simulated surface profile data from a plurality of worksites 14.

In the machine position generating step 32 actual and/or simulated route data may be generated. In particular, the navigation system may determine actual coordinates indicative of the position of the work machine 11 as it moves along the route 12 and generate actual route data indicative of the actual route 12. Alternatively, the route 12 of the machine may be simulated by generating simulated route data and/or retrieving previously generated actual or simulated route data indicative of a simulated route 12. For example, an operator may explicitly define a route 12 of the work machine 11 over the terrain 13. Alternatively, the computer system 16 may determine an optimal path of the work machine 11 over the terrain utilising the surface profile data, as discussed in further detail below.

In the operating parameter generating step 33 actual and/or simulated machine operational data may be generated and may comprise data associated with at least one operating parameter of the machine simulator. The actual and/or simulated machine operational data may comprise a single value of at least one operating parameter or a variation of the at least one operating parameter along the route 12 and/or in relation to a time period.

The machine control system 20 may determine at least one operating condition, which may be any of the operating conditions described above, of the work machine 11 as it actually moves along the route 12 and generate actual machine operational data. The machine control system 20 may monitor at least one input 22 indicative of the actual inputs received from an operator, such as throttle position, gear selection, steering wheel or joystick manipulation, brake pedal application, retarder application and the like. Thus the machine operational data may comprise actual machine operational data indicative of actual operator inputs. The machine control system 20 may monitor the at least one output 23 indicative of the actual outputs resulting from at least one input 22 from an operator. For example, the machine control system 20 may monitor engine speed, machine speed (i.e. the actual speed of the at least one machine 11 moving over the terrain 13), gear selection, direction of travel or the route 12, a differential lock engagement and the like. The machine control system 20 may monitor both at least one input 22 and at least one output 23 in order to account for both operator control and automatic control of the at least one output 23. Alternatively, the actual machine operational data may be determined from the data received from the at least one sensor.

Simulated machine operational data may be determined by the computer system 16 generating at least one simulated operating condition and/or by retrieving previous generated simulated machine operational data from a memory. The at least one simulated operating condition may be specified by an operator (i.e. a human). The computer system 16 may store simulated machine operational data indicative of at least one optimal operating condition of the work machine 11. The optimal operating condition of the work machine 11 may be associated with known surface profiles and/or ranges and/or values of inclinations of terrain.

The computer system 16 may store an optimal operating condition database on its memory containing optimal operating conditions associated with a plurality of known surface profiles and routes 12. The computer system 16 may process the actual surface profile data of the route 12 to determine the closest known surface profile to the actual surface profile. The simulated operating condition for the known surface profile may subsequently be retrieved from the optimal operating condition database and utilised in the simulated machine operational data. For example, simulated machine operational data indicative of the machine speed may be selected based upon the inclination of the work machine 11 on the route 12 such that the machine speed is at a safe level for the inclination. The computer system 16 may break the actual surface profile and known surface profile into portions such that a plurality of known surface profiles may be accorded to the actual surface profile. Therefore, the simulated machine operational data may comprise a variation of the at least one simulated operating parameter along the route to match it to the optimal operating condition for each portion of the actual surface profile.

The computer system 16 may store a look-up table of at least one optimal operating condition associated with a value and/or range of inclinations of the terrain 13. The computer system 16 may process the actual surface profile data and route 12 therealong to determine the inclination of the terrain 13 along the route 12. The computer system 16 may retrieve data from the look-up table to assign at least one optimal operating condition to the inclination of the terrain 13. The at least one optimal operating condition assigned may vary along the route 12 to match variations in the inclination.

Furthermore, the simulated machine operational data may be selected based upon actual machine operational data in order to ensure that if at least one actual operating condition is measured, all of the rest of the operating parameters required for the machine simulator to perform the simulation may be obtained. As discussed above, the machine model and/or simulation algorithm may require a plurality of operating parameters. If actual machine operational data is not provided for all of the required operating parameters, the computer system 16 may retrieve or determine simulation operational data for the rest of the required operating parameters. For example, if the actual machine speed is used but there is no measurement of actual payload of the work machine 11, an estimated or average payload may be retrieved from a memory and incorporated into the simulated machine operational data.

In the machine model retrieval step 34 the at least one work machine 11 type may be identified and a machine model representative of the at least one work machine 11 retrieved from the memory. In particular, identification data may be transmitted from the at least one work machine 11 to the computer system 16 such that the computer system 16 may retrieve the appropriate machine model. During the machine model retrieval step 34 model parameter may also be retrieved, although it may be integral with the machine model.

At a simulation step 35 the computer system 16 may receive the simulated or actual surface profile, machine position and operating condition data and implement the simulation algorithm and machine model based upon the at least one structural parameter. In particular, the computer system 16 may simulate the operation of the at least one work machine 11 as it moves along the route 12 over the actual or simulated surface profile in accordance with the at least one actual or simulated operating parameter. During the simulation monitored operating condition data may be generated, which may be indicative of at least one monitored operating condition of at least one machine structure of the at least one work machine 11. The at least one monitored operating condition may be different to the at least one operating parameter and may be monitored based upon the machine model of the at least one work machine 11. The machine model may be configured to enable calculations to be performed to generate monitored operating condition data indicative of the effect on the at least one monitored operating condition of the simulated or actual surface profile, machine position and operating condition data and the at least one structural parameter.

At an analysis step 36 the monitored operating condition data may be processed in order to analyse the behaviour of the work machine 11 as it travels along the route 12. At least one type of analysis, as described below, may be carried out. The results of the analysis step 36 may be displayed to an operator on a display, such as in the form of at least one plot, gauge, map or table.

In a structural analysis the stress and/or strain imposed on at least one machine structure during the simulation may be monitored. For example, FEA, flexible body and/or multi-body analysis of the at least one machine structure may be performed utilising the simulation algorithm and machine model. The structural analysis may be continuously performed and/or discretely performed and extrapolated in order to determine the stress and/or strain imposed on at least one machine structure as the work machine 11 moves along the route 12. The resulting structural analysis data generated may be presented to an operator on the display as a graph (for example with stress and/or strain on the Y axis and distance along the route on the X axis) and/or utilised by the computer system 16 to perform further tasks. The structural analysis data may therefore represent a substantially similar output to a strain sensor located on the at least one actual machine structure.

In a stress and/or strain rate analysis the computer system 16 may calculate the stress and/or strain imposed upon at least one machine structure over a time period. For example, the computer system 16 may be operable to determine an average stress and/or strain over a time period. Alternatively, the stress and/or strain rate may be calculated by determining the maximum stress and/or strain over a short time period and then averaging the maximum stress and/or strain of a plurality of short time periods constituting a longer time period.

In a structure lifespan analysis the computer system 16 may calculate the expected lifetime of at least one machine structure. The expected lifetime may be a time period and may be based upon the stress and/or strain rate upon the at least one machine structure (e.g. the average stress and/or strain rate of the at least one machine structure) and a maximum lifetime stress and/or strain accumulation or rate associated with the at least one machine structure. In the structure lifespan analysis the computer system 16 may also determine whether the at least one machine structure has reached the expected lifetime. The maximum lifetime stress and/or strain may be a value and/or range and may be stored on the memory of the computer system 16. The maximum lifetime stress and/or strain may be defined by an operator and may be associated with a total stress and/or strain experienced by the at least one machine structure at which the at least one machine structure is expected to fail. The maximum lifetime stress and/or strain may account for a safety factor.

In a maintenance analysis the computer system 16 may utilise the structural analysis, the structure lifespan analysis and/or the stress and/or strain rate analysis to determine when at least one machine structure needs to be replaced and/or repaired. Based upon the determination the computer system 16 may issue an alert to an operator that at least one machine structure needs to be replaced and/or repaired. The computer system 16 may determine that at least one machine structure needs to be replaced and/or repaired if a structural and/or stress and/or strain rate analysis indicates that during operation of the at least one work machine 11 the stress and/or strain exceeded a threshold magnitude, total and/or rate. The threshold magnitude, total or rate may be associated with a single instance of a stress and/or strain magnitude (e.g. a sudden spike in stress on a machine structure), summation of stress and/or strain over time or a rate of change of a stress and/or strain at which the integrity of the at least one machine structure may be compromised, such as by reaching or approaching a yield point (e.g. a magnitude at which cracks are likely to form or failure might occur). The computer system 16 may determine that at least one machine structure needs to be replaced and/or repaired if a structure lifespan analysis indicates that the at least one machine structure has reached, or is reaching, its calculated expected lifetime.

In the maintenance analysis the computer system 16 may also determine a suitable time (e.g. a date or date range) at which to schedule a service or overhaul of the at least one work machine 11. In the present disclosure "service" or "overhaul" may relate to periodic general maintenance of the at least one work machine 11. The maintenance analysis may set the service or overhaul date based upon the shortest structure lifespan of any of those calculated in the structure lifespan analysis. The service or overhaul date may also be set based upon weather and/or corrosive limits associated with at least one machine structure.

In a worksite duty analysis the computer system 16 may assign a worksite duty segment to the at least one worksite 14 and/or may assess the suitability of operating at least one work machine 11 on at least one worksite 14. The computer system 16 may store data related to a plurality of worksite duty segments, such as a light duty segment, at least one medium duty segment or a heavy duty segment. The computer system 16 may also associate each worksite duty segment with a range of values associated with any of the analyses discussed herein. The computer system 16 may associate a worksite duty segment with a range of magnitudes and/or rates of change of stress and/or strain on at least one machine structure of at least one work machine 11. The low duty segment may be associated with a range below a first duty threshold and the high duty segment may be associated with a range above the first or a second duty threshold, the second duty threshold being above the first duty threshold. The at least one medium duty segment may define one or more ranges between the first and second duty thresholds.

The computer system 16 may assign a worksite duty segment to the at least one worksite 14 based upon the stress and/or strain rate analysis and/or the structural analysis. A worksite duty segment may assigned based upon the monitored stress and/or strain magnitude and/or rate meeting or falling within the range of magnitudes and/or rates of change of stress and/or strain associated with the worksite duty segment.

The computer system 16 may store data associated with a plurality of work machines 11, a plurality of worksite duty segments and the suitability of each of the plurality of work machines 11 to each of the plurality of worksite duty segments. The computer system 16 may also assess the suitability of the at least one work machine 11 to the worksite 14 based upon the stress and/or strain rate analysis and/or the structural analysis on at least one work machine 11. If the at least one work machine 11 is not suitable for the worksite duty segment associated with the worksite 14, the computer system 16 may generate an alert to an operator and may propose at least one different work machine 11 that is more suitable for the worksite duty segment.

The computer system 16 may be configured to run the machine simulator to simulate a plurality of work machines 11 travelling along a simulated route 12 in accordance with at least one simulated operating parameter and thereby generate monitored operating condition data for each work machine 11. Based upon which worksite duty segment the monitored operating condition data is associated with, and the data associating at least one work machine 11 to a worksite duty segment, the computer system 16 may determine a suitable type of work machine 11 for the worksite 14.

In a warranty analysis the computer system 16 may determine a warranty period based upon any of the analyses discussed herein. Therefore, the system 10 may be utilised to specify variable warranties of the at least one work machine 11. A "warranty" may be considered in the present disclosure to be a guarantee, issued to the operator of the at least one work machine 11 by its manufacturer and/or seller, promising to repair or replace the at least one work machine 11 and/or a part thereof if necessary within a specified 'warranty period', which may be a time warranty period. The warranty period may be associated with at least one machine structure lifespan calculated in the structure lifespan analysis. A warranty period may be specified based upon a maximum accumulation of stress and/or strain on at least one machine structure rather than an actual time period. Alternatively, a warranty period may be specified based upon a maximum magnitude of stress and/or strain on at least one machine structure. The warranty period may be specified based upon the worksite duty analysis. As a result, if an operator operates the at least one work machine 11 under very heavy duty conditions (e.g. a short structure lifespan, a heavy duty worksite and/or reaching a maximum summation of stress and/or strain) the warranty may be reduced or cancelled accordingly. The warranty period may be based upon actual machine operational data indicative of undesired operating parameters of the at least one work machine 11. For example, the warranty period may be reduced if a retarder is not utilised and/or service brakes are only utilised, or if at least one work machine 11 is operated down a grade out of gear (i.e. in neutral) rather than in gear.

In a terrain analysis the computer system 16 may identify terrain events associated with the terrain 13. The computer system 16 may determine the location of at least one terrain event based upon the actual or simulated route data, actual or simulated surface profile data, actual or simulated machine operational data and/or the monitored operating condition data. In particular, the terrain event may be identified at a location on the terrain 13 where at least one monitored operating condition exceeds an event threshold value. The memory of the computer system 16 may store a plurality of event threshold values associated with different terrain events.

The computer system 16 may utilise data obtained via the stress and/or strain rate analysis and/or the structural analysis and may identify a terrain event associated with the roughness of the terrain 13. In the present disclosure "roughness" may refer to the size of variations, irregularities or bumps of the surface of the terrain 13. A relatively high roughness may indicate a heavy duty worksite 14 (e.g. having a very rocky terrain 13) and a relatively low roughness may indicate a low duty worksite 14 (e.g. having a very smooth terrain 13). A terrain event may be identified where the monitored stress and/or strain magnitude and/or rate on at least one machine structure exceeds an event threshold value. A terrain event may also be identified over a region of the terrain 13 in which the rate of change of, or a summation of, simulated stress and/or strain rate exceeds an event threshold value. Such terrain events may therefore indicate a location of the terrain 13 imposing a relatively high stress and/or strain on the at least one machine structure and thus at least one work machine 11.

A terrain event may also be determined from the surface profile data. A terrain event may be associated with a gradient of the terrain 13 and a terrain event may be identified by processing the surface profile data to identify where the magnitude and/or rate of change of the gradient is above an event threshold value. A terrain event may be associated with at least one obstacle (such as a building, other work machine 11, impassable terrain or the like), which may be identified by processing the surface profile data or by an operator associating the location of such obstacles with the surface profile data. A terrain event may be a location at which ejection from an articulated hauler is not suitable by virtue of tip-over being likely at the terrain event due to a high gradient.

In the terrain analysis the computer system 16 may identify at least one terrain event and perform further operations based upon the identification. The computer system 16 may identify at least one terrain event associated with the route 12 and propose a new route 12 for the at least one work machine 11 to follow. For example, the computer system 16 may identify an area of relatively rough terrain 13, steep gradient and/or obstacle and adjust the route 12 to avoid the relatively rough terrain 13, steep gradient and/or obstacle. Alternatively, the computer system 16 may identify at least one terrain event based upon operating the machine simulator based upon actual surface profile data, simulated route data and simulated machine operating condition data.

A terrain event may be identified by assessing the point cloud data of the actual surface profile data. The terrain event may, for example, be a bump, pot hole, ditch, rock, cliff or the like. The point cloud data may be processed to identify variation of a predetermined percentage of adjacent points by a preset distance and associate the variation with the terrain event. For example a variation of 80% of adjacent points by at least 100 mm, relative to surrounding points, may indicate the presence of a pot hole.

The computer system 16 may generate an optimal route 12 by running the machine simulator for a plurality of different routes 12 until the route 12 with the lowest number, if any, of terrain events is identified and proposing that route 12 as the optimal route 12. The optimal route 12 may also be selected based upon the machine productivity along the route 12. The optimal route 12 may be determined utilising any analytical method known in the art, such as a neural network algorithm or the like. In particular, the analytical method may comprise assessing a plurality of routes 12 across the terrain 13 between first and second locations. The plurality of routes 12 may be stored on a database and may be specified by an operator. The computer system 16 may determine the efficiency of each of the plurality of routes 12, for example based upon efficiency data associated with monitored operating condition data. The efficiency data may be fuel efficiency, stress and/or strain, efficient machine speed and the like of the at least one machine 11. The optimal route 12 may be the route 12 with the optimal efficiency. The plurality of routes 12 may be segmented between first and second locations and each segment assessed individually. In a particular example, a plurality of routes 12 may be segmented. The stress and/or strain on at least one machine structure when travelling across each segment may be assessed. The optimal route 12 may be the route 12 comprising the segments having the lowest total summation of stress and/or strain on the at least one machine structure.

The computer system 16 may identify at least one terrain event and issue an alert to an operator and/or the at least one work machine 11 may be operated based upon the at least one identified terrain event. The operator may subsequently remove the at least one terrain event, for example by removing an obstacle from the terrain 13 or by performing maintenance on the terrain 13. In particular, at least one work machine 11 may be operated manually or autonomously to travel to the location of the at least one terrain event and adjust the terrain 13 to remove, or reduce the negative impact of, the at least one terrain event. For example, the at least one work machine 11 may smooth or compact the terrain 13 at and/or remove an obstacle or the like from the location of the at least one terrain event.

The operator may be alerted to the location of the terrain event and the operator may adjust the operation of the at least one work machine 11 accordingly. In particular, the operator may steer the at least one work machine 11 to avoid a terrain event or reduce the speed of the at least one work machine 11 to reduce any impact of the terrain event on the at least one work machine 11. The computer system 16 may also determine, for example via look up tables or an algorithm, a maximum machine speed limit based upon the properties of the at least one identified terrain event. The maximum machine speed limit may be set based upon the stress and/or strain magnitude and/or rate simulated for the terrain event and the associated event threshold value. The operator may be notified of the maximum machine speed limit or the maximum machine speed limit may be communicated to the machine control system 20, which may subsequently maintain the at least one work machine 11 at or below the maximum speed limit when passing over the terrain event.

Any of the aforementioned analyses may be combined in order to improve the productivity and utilisation of the at least one work machine 11. For example, the computer system 16 may perform a simulation of the at least one work machine 11 travelling at the maximum machine speed along the optimal route 12 to determine the productivity of the optimal route 12, such as in terms of fuel efficiency. The overall efficiency of the worksite 14 may subsequently be determined.

INDUSTRIAL APPLICATION

The system 10 may be operated in accordance with a method 30 comprising any combination of at least one of the surface profile generating, machine position generating, operating parameter generating, machine model retrieval, simulation and/or analysis steps 31, 32, 33, 34, 35, 36 described above. In any method 30, one or more of the different analyses may be performed in the analysis step 36. Specific embodiments of the method 30 are described below.

In a first method the system 10 may generate actual surface profile data at the surface profile generating step 31, actual route data at the machine position generating step 32 and actual machine operational data at operating parameter generating step 33. As a result, during the simulation step 35 the actual operation of at least one work machine 11 on the actual worksite 14 may be simulated by the computer system 16.

In the structural analysis, stress and/or strain rate analysis and/or structure lifespan analysis the effect on at least one machine structure during the operation of the at least one work machine 11 may be monitored via the simulation. The work machine 11 may therefore not require a plurality of sensors 24 in order to monitor the operating conditions on each of the at least one machine structures. The work machine 11 may have a relatively lower production cost and the machine control system 20 may have a relatively low complexity due to the absence of a plurality of sensors 24. Processing requirements are therefore reduced. Furthermore, it may be possible to monitor the operating condition of at least one machine structure that cannot be monitored utilising at least one sensor 24. For example, the at least one machine structure may be an internal part of an engine (e.g. a cylinder wall) that cannot be monitored. In addition, provided that a machine model of the at least one work machine 11 is available for the machine simulator, the system 10 and method 30 may be retrofitted or applied to any type of work machine 11.

The structure lifespan analysis and maintenance analysis may enable the lifespans of at least one machine structure of the at least one work machine 11 to be tracked and maintenance planned. Servicing schedules and repairs can therefore be based upon when a machine structure actually needs repairing or replacing rather than on a periodic basis. During normal periodic servicing machine structures may be replaced before they have reached the end of their lifespan. However, with the first method the machine structures may be replaced at, or close to, the end of their lifespans. Furthermore, failure of a machine structure may be anticipated based upon the maintenance analysis and the machine structure repaired or replaced. The operator of the at least one work machine 11 may also be able to ensure that replacement machine structures are available around the expected expiry of the lifespan of at least one machine structure. As a result, stocks of replacements machine structures may be managed relatively efficiently and downtime reduced, which may occur if replacement machine structures are not available due unexpected failures.

The worksite duty analysis enables the identification of at least one work machine 11 being operated on the worksite 14 that is not suitable for use on the worksite 14 and the identification of at least one more suitable work machine 11. The warranty analysis may enable warranties to be varied and/or matched to at least one work machine 11 based upon the actual usage of the at least one work machine 11.

The terrain analysis may enable the route 12 and/or terrain 13 to be continuously optimised based upon the actual machine data. Where terrain events are identified based upon the actual machine data the route 12 may be adapted to avoid the terrain events and/or the terrain 13 may be adapted in order to remove the terrain events. Furthermore, the at least one work machine 11 may be operated based upon the at least one terrain event, such as by speed limiting, in order to extend the lifetime of, improve the efficiency of and improve the operational safety of the at least one work machine 11

In a second method the system may generate actual surface profile data at the surface profile generating step 31, actual or simulated route data at the machine position generating step 32 and simulated machine operational data at operating parameter generating step 33. As a result, during the simulation step 35 the operation of at least one work machine 11 on the actual worksite 14 may be entirely simulated by the computer system 16. Thus all of the analyses may be similar to the first method, except that the monitored operating condition data may differ slightly if the simulated operating parameters differ from the actual operating parameters of the at least one work machine 11 travelling along the route 12.

In the structural analysis, stress and/or strain rate analysis and/or structure lifespan analyses the effect of the actual terrain 13 on at least one work machine 11 may be simulated. In the worksite duty analysis the worksite 14 may be allocated a worksite duty segment, which may be utilised for selection of at least one work machine 11 and/or to assess the viability of performing operations at the worksite 14. In the terrain analysis, at least one work machine 11 suitable for the worksite 14 may be selected and at least one optimised route 12 across the worksite 14 determined. Therefore, before a work machine 11 has been operated on a worksite 14 it is possible to perform an analysis of the efficiency of the worksite 14 and at least one work machine 11 operating on the worksite 14. This enables the selection of a suitable worksite 14 by an operator if more than one option for a worksite 14 is available them.

In a third method the data relating to at least one machine model, simulation algorithm, surface profile data, simulated route data and simulated machine operational data may be adjusted based upon feedback from actual surface profile data, actual route data and/or actual machine operational data. This feedback may be provided after at least one simulation in accordance with the first and/or second method has been performed.

The actual surface profile data may be initially gathered by at least one surveying device 15. This initial surface profile data may subsequently be updated utilising actual surface profile data gathered by the same or different at least one surveying device 15. For example, a UAV may gather the initial surface profile data of the entire worksite 14 and a surveying device 15 attached to a work machine 11 may gather further surface profile data around the route 12. Alternatively, the at least one surveying device 15 may continuously monitor the terrain 13 as it changes due to at least one work machine 11 moving material around the worksite 14. The further surface profile data may be combined with the initial surface profile data by overwriting the appropriate data. In accordance with this method the actual surface profile data may be kept up-to-date and accurate.

The simulated route data and simulated machine operational data may be utilised in a first simulation in accordance with the second method, in which monitored operating condition data is obtained based upon at least one work machine 11 moving along a simulated route in accordance with at least one simulated operating parameter. Subsequently, the at least one work machine 11 may be operated on the worksite 14 along an actual route and actual route data and actual machine operational data generated. The simulated route data and simulated machine operational data may be updated based upon the actual route data and actual machine operational data. Therefore, in second and further simulations under the first and/or second method the machine simulator may more accurately reflect the operation of the at least one work machine 11 on the worksite 14.

In particular, the simulated route data may be made identical to the actual route data and/or the simulated machine operational data may be made identical to the actual machine operational data. All or only part of the simulated route data and simulated machine operational data may be replaced by the actual route data and actual operational data. The simulated route data and simulated machine operational data may be replaced by the actual route data and actual operational data if they differ by more than a route data threshold and/or a machine operational data threshold along all or part of the actual or simulated route. The route data threshold may be in units of distance and may comprise a distance of less than approximately 30 meters, less than approximately 20 meters, less than approximately 10 meters, less than approximately 5 meters and/or less than approximately 1 meter. The machine operational data threshold may be in the units of the at least one operating parameter (e.g. speed, angle of steering, throttle input and the like) and may comprise a difference of less than approximately 20%, less than approximately 10%, less than approximately 5%, and/or less than approximately 1%.

The actual route 12 driven may be the same, or substantially similar to, the simulated route 12. For example, the actual route 12 may be within a threshold distance or boundary of the simulated route 12. As a result, the simulated route data may not be updated and in the second and further simulations. Therefore, the second and further simulations may be optimised by virtue of utilising updated simulated machine operational data to improve the accuracy of the machine simulator. Alternatively, if the actual route 12 driven is different to the simulated route 12, particularly beyond a threshold distance or boundary of the simulated route 12, the simulated route data may be updated to reflect the actual route data. Therefore, the second and further simulations may be optimised by virtue of utilising updated simulated machine operational data and simulated route data, reflecting the actual use of at least one work machine 11, to improve the accuracy of the machine simulator.

The machine model and/or simulation algorithm may also be updated based upon a comparison of simulated monitored operating condition data and actual monitored operating condition data. The simulated monitored operating condition data may be generated by operating the machine simulator at least once, such as in accordance with the first and/or second method described above or in any combination of the surface profile generating, machine position generating, operating parameter generating, machine model retrieval, simulation and/or analysis steps 31, 32, 33, 34, 35, 36 described above. The at least one work machine 11 may subsequently be operated to move along the route 12 (or at least a substantially similar route 12) and the at least one sensor 24 may monitor at least one actual operating condition that corresponds to the at least one monitored operating condition upon which the simulated monitored operating condition data is based. The at least one sensor 24 may therefore generate actual monitored operating condition data indicative of the actual conditions of the at least one operating condition during the movement of the at least one work machine 11. Subsequently, the simulated monitored operating condition data may be compared to the actual monitored operating condition data and the machine model and/or simulation algorithm may be updated. As a result, in subsequent operations of the machine simulator the simulated monitored operating condition data may be more accurate and representative of the actual performance of the at least one work machine 11.

The machine model and/or simulation algorithm may be updated if the actual and simulated monitored operating condition data for at least one machine structure over all or part of the route 12 differ by more than a monitored operating condition threshold value. The machine model and/or simulation algorithm may be updated by adjusting at least one structural parameter associated with the generation of the simulated monitored operating condition data for the at least one machine structure. In particular, the at least one structural parameter may be adjusted such that the actual and simulated monitored operating condition data are the same or fall within a predetermined range of one another. Therefore, the machine model and/or simulation algorithm may be updated and corrected as the physical properties of machine structures vary with age.

For example, the behaviour, such as the vibration characteristics or spring extension characteristics, of a suspension system (i.e. a machine structure) of a work machine 11 travelling along a route 12 may be simulated based upon a first stiffness value (i.e. a structural parameter), thereby generating behaviour data (i.e. simulated monitored operating condition data). The actual behaviour of the suspension system may be monitored utilising a position sensor on the work machine 11 to generate actual behaviour data (i.e. actual monitored operating condition data). The simulated and actual monitored operating condition data may be compared and if they differ above a monitored operating condition threshold value, for example by the actual spring extension being substantially different to the simulated spring extension, the first stiffness value may be replaced with a second stiffness value. The second stiffness value may be calculated based upon the actual spring extension. Therefore, in future simulations the stiffness value may be more representative of the actual suspension system.

The invention claimed is:

1. A method of monitoring the operation of at least one work machine comprising:
   operating at least one surveying device to measure a surface profile of a terrain of a worksite and generate actual surface profile data indicative of the surface profile;
   operating at least one work machine to move along a route over the terrain in accordance with at least one actual operating parameter and generating actual machine operational data indicative of the at least one actual operating parameter;
   operating a navigation system to determine the route and generate actual route data indicative of the route; and
   operating a processing unit to process the actual route data, actual machine operational data and actual surface profile data to generate monitored operating condition data indicative of at least one monitored operating condition of the at least one work machine moving along the route in accordance with the at least one actual operating parameter.

2. The method as claimed in claim 1 further comprising operating at least one work machine and generating an alert for an operator based upon the monitored operating condition data or displaying the monitored operating condition data on a display.

3. The method as claimed in claim 2 wherein the monitored operating condition data is generated based upon at least one machine model or simulation algorithm.

4. The method as claimed in claim 3 wherein the at least one work machine comprises at least one machine structure and the monitored operating data is indicative of at least one monitored operating condition of the at least one machine structure.

5. The method as claimed in claim 4 wherein the at least one monitored operating condition comprises a monitored stress or strain magnitude or rate experienced by at least one machine structure as the at least one work machine moves along the route.

6. The method as claimed in claim 5 further comprising determining an expected lifetime of the at least one machine structure based upon the monitored operating condition data and a maximum lifetime stress or strain accumulation or rate associated with the at least one machine structure.

7. The method as claimed in claim 5 further comprising generating an alert indicative of at least one machine structure requiring repair or replacement, the alert being generated if the monitored stress or strain magnitude or rate meets a threshold magnitude or rate, respectively.

8. The method as claimed in claim 7 further comprising:
   assigning a worksite duty segment to the worksite based upon the monitored stress or strain magnitude or rate meeting or falling within a range of magnitudes or rates of change, respectively, of stress or strain associated with the worksite duty segment; and
   generating an alert indicative of the worksite duty segment; or
   generating an alert indicative of whether the at least one work machine is matched to the worksite duty segment based upon data associated with a plurality of work machines, a plurality of worksite duty segments and the suitability of each of the plurality of work machines to each of the plurality of worksite duty segments.

9. The method as claimed in claim 8 wherein at least one terrain event is identified and at least one work machine is operated based upon the identified terrain event and an alert is generated, the at least one terrain event being identified at a location of the terrain where:
   at least one monitored operating condition exceeds an event threshold value;
   the monitored stress or strain magnitude or rate on at least one machine structure exceeds an event threshold value;
   the rate of change of, or a summation of, simulated stress or strain rate exceeds an event threshold value; or
   the magnitude or rate of change of a gradient of the surface profile is above an event threshold value, the magnitude or rate of change of the gradient being determined by processing the actual surface profile data.

10. A system for monitoring at least one work machine and comprising:
    at least one work machine;
    at least one surveying device configured to measure a surface profile of a terrain of a worksite and generate actual surface profile data indicative of the surface profile;
    a navigation system configured to determine the route of the at least one work machine as it moves over the terrain and generate actual route data indicative of the route;
    at least one sensor configured to generate actual machine operational data indicative of at least one actual operating parameter of the at least one work machine whilst moving along the route; and a processing unit configured to process the actual route data, actual machine operational data and actual surface profile data to generate monitored operating condition data indicative of at least one monitored operating condition of the at least one work machine moving along the route in accordance with the at least one actual operating parameter.

11. The system as claimed in claim 10 further comprising a computer system, the computer system comprising the processing unit, and a machine control system for controlling the operation of the at least one work machine, wherein the computer system is separate from or integrated with the machine control system.

12. The system as claimed in claim 11 wherein the at least one surveying device:
is separate from or integrated with the at least one work machine;
comprises at least one of a manned aircraft, an unmanned aerial vehicle or a manned or unmanned dedicated surface profile scanning vehicle; and
obtains the actual surface profile data via photogrammetry, radar, LIDAR, laser scanners, video systems or audio systems.

13. A method of monitoring the operation of at least one work machine comprising:
operating at least one surveying device to measure a surface profile of a terrain of a worksite and generate actual surface profile data indicative of the surface profile;
receiving route data indicative of a route of at least one work machine moving over the terrain;
receiving simulated machine operational data indicative of at least one simulated operating parameter of the at least one work machine whilst moving along the route,
processing the route data, simulated machine operational data and actual surface profile data to generate monitored operating condition data indicative of at least one monitored operating condition of the at least one work machine moving along the route in accordance with the at least one simulated operating parameter.

14. The method as claimed in claim 13 comprising:
receiving simulated route data indicative of a simulated route of at least one work machine moving over the terrain;
operating at least one work machine to move along an actual route over the terrain in accordance with at least one actual operating parameter and generating actual machine operational data indicative of the at least one actual operating parameter;
operating a navigation system to determine the route and generate actual route data indicative of the actual route; and
processing the simulated route data and actual route data and updating the simulated route data based upon the actual route data, and processing the simulated machine operational data and actual machine operational data and updating the simulated machine operational data based upon the actual machine operational data.

15. A method of monitoring the operation of at least one work machine comprising:
operating at least one surveying device to measure a surface profile of a terrain of a worksite and generate actual surface profile data indicative of the surface profile;
receiving route data indicative of a route of at least one work machine moving over the terrain;
receiving machine operational data indicative of at, least one simulated operating parameter of the at least one work machine whilst moving along the route,
processing the route data, machine operational data and actual surface profile data to generate simulated monitored operating condition data indicative of at least one monitored operating condition of the at least one work machine moving along the route in accordance with the at least one operating parameter, the simulated monitored operating condition data being determined based upon a machine model or simulation algorithm;
operating at least one work machine to move along the route over the terrain in accordance with at least one actual operating parameter and generating actual machine operational data indicative of the at least one actual operating parameter;
operating at least one sensor to generate actual monitored operating condition data indicative of the at least one monitored operating condition as the at least one work machine moves along the route in accordance with the at least one actual operating parameter; and
processing the actual monitored operating condition data and simulated monitored operating condition data and updating the machine model or simulation algorithm based upon the actual monitored operating condition data and simulated monitored operating condition data.

* * * * *